United States Patent
Fujiwara (10) Patent No.: US 11,689,679 B1
(45) Date of Patent: Jun. 27, 2023

(54) IMAGE FORMING APPARATUS

(71) Applicant: Yasuhiro Fujiwara, Kanagawa (JP)

(72) Inventor: Yasuhiro Fujiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/155,287

(22) Filed: Jan. 17, 2023

(30) Foreign Application Priority Data

Jan. 28, 2022 (JP) .............................. JP2022-012021
Sep. 27, 2022 (JP) .............................. JP2022-153685

(51) Int. Cl.
*G06F 15/00* (2006.01)
*H04N 1/23* (2006.01)
*G03G 15/00* (2006.01)
*H04N 1/32* (2006.01)

(52) U.S. Cl.
CPC ......... *H04N 1/233* (2013.01); *G03G 15/5054* (2013.01); *H04N 1/32133* (2013.01); *H04N 2201/3271* (2013.01)

(58) Field of Classification Search
CPC ............... H04N 1/233; H04N 1/32133; H04N 2201/3271; G03G 15/5054
USPC ....................................................... 358/1.2
See application file for complete search history.

(56) References Cited

U.S. PATENT DOCUMENTS

2009/0190182 A1* 7/2009 Ishikawa ............ H04N 1/32299
382/100
2011/0317186 A1* 12/2011 Tanaka ..................... H04N 1/46
358/1.9
2013/0266332 A1 10/2013 Miyazaki et al.
2014/0153955 A1 6/2014 Yamashita et al.
2014/0153982 A1 6/2014 Adachi et al.
2015/0003852 A1 1/2015 Yamashita et al.
2017/0336729 A1 11/2017 Ohi et al.
2020/0344382 A1* 10/2020 Yamamoto ......... H04N 1/32144
2021/0120142 A1* 4/2021 Fujitani ................ H04N 1/2361
2021/0197583 A1 7/2021 Fujiwara
2022/0137542 A1 5/2022 Fujiwara

FOREIGN PATENT DOCUMENTS

| JP | 7-087297 | 3/1995 |
| JP | 2003-209681 | 7/2003 |
| JP | 2006-086881 | 3/2006 |
| JP | 2017-151135 | 8/2017 |

* cited by examiner

*Primary Examiner* — Mark R Milia
(74) *Attorney, Agent, or Firm* — IPUSA, PLLC (57) ABSTRACT

An image forming apparatus includes an image bearer, an image former, a transferor, and circuitry. The image bearer bears an image and an identification pattern. The image former forms the image and the identification pattern on the image bearer. The transferor transfers the image and the identification pattern on the image bearer directly or indirectly to a recording medium. The circuitry determines whether the identification pattern is an image portion pattern arranged at a position superimposed on the image or a position adjacent to the image, or a non-image portion pattern arranged at neither a position superimposed on the image nor a position adjacent to the image. The circuitry further causes the image former to form the non-image portion pattern larger than the image portion pattern.

6 Claims, 12 Drawing Sheets

IMAGE PORTION PATTERN

FIG. 8B

NON-IMAGE PORTION PATTERN

FIG. 9A

IMAGE PORTION PATTERN

FIG. 9B

NON-IMAGE PORTION PATTERN

FIG. 14A
TRACKING PATTERNS

FIG. 14B
INPUT IMAGE (Bk)

FIG. 14C
INPUT IMAGE (C)

FIG. 14D
INPUT IMAGE (M)

FIG. 14E
INPUT IMAGE (Y)

IMAGE FORMING APPARATUS

CROSS-REFERENCE TO RELATED APPLICATION

This patent application is based on and claims priority pursuant to 35 U.S.C. § 119(a) to Japanese Patent Application No. 2022-012021, filed on Jan. 28, 2022, and Japanese Patent Application No. 2022-153685, filed on Sep. 27, 2022, in the Japan Patent Office, the entire disclosure of each of which is hereby incorporated by reference herein.

BACKGROUND

Technical Field

The present disclosure relates to an image forming apparatus.

Related Art

Some of image forming apparatuses, such as photocopiers or printers, form, in addition to an image originally intended to be formed, identification patterns including identification information.

The identification patterns include, for example, tracking patterns that enable the tracking of information, such as which apparatus has formed an image, and information, such as the manufacture number of the image forming apparatus that has formed an image, is represented by a predetermined dot pattern.

Such tracking patterns need to be reliably formed, but the visibility of the tracking patterns may vary due to various factors.

SUMMARY

In an embodiment of the present disclosure, an image forming apparatus includes an image bearer, an image former, a transferor, and circuitry. The image bearer bears an image and an identification pattern. The image former forms the image and the identification pattern on the image bearer. The transferor transfers the image and the identification pattern on the image bearer directly or indirectly to a recording medium. The circuitry determines whether the identification pattern is an image portion pattern arranged at a position superimposed on the image or a position adjacent to the image, or a non-image portion pattern arranged at neither a position superimposed on the image nor a position adjacent to the image. The circuitry further causes the image former to form the non-image portion pattern larger than the image portion pattern.

According to the present disclosure, the visibility of an identification pattern which arranged at a position superimposed on the image or a position adjacent to the image is ensured.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 is a diagram illustrating an example in which the sizes of image portion patterns are varied according to which photoconductor the image portion patterns are formed on;

The accompanying drawings are intended to depict embodiments of the present disclosure and should not be interpreted to limit the scope thereof. The accompanying drawings are not to be considered as drawn to scale unless explicitly noted.

DETAILED DESCRIPTION

Hereinafter, the present disclosure will be described with reference to the accompanying drawings. In the drawings for describing the present disclosure, constituents, such as members and components, having the same function or shape are denoted by the same reference numeral as far as the determination is possible, so that the description will not be repeated.

Figure 1:
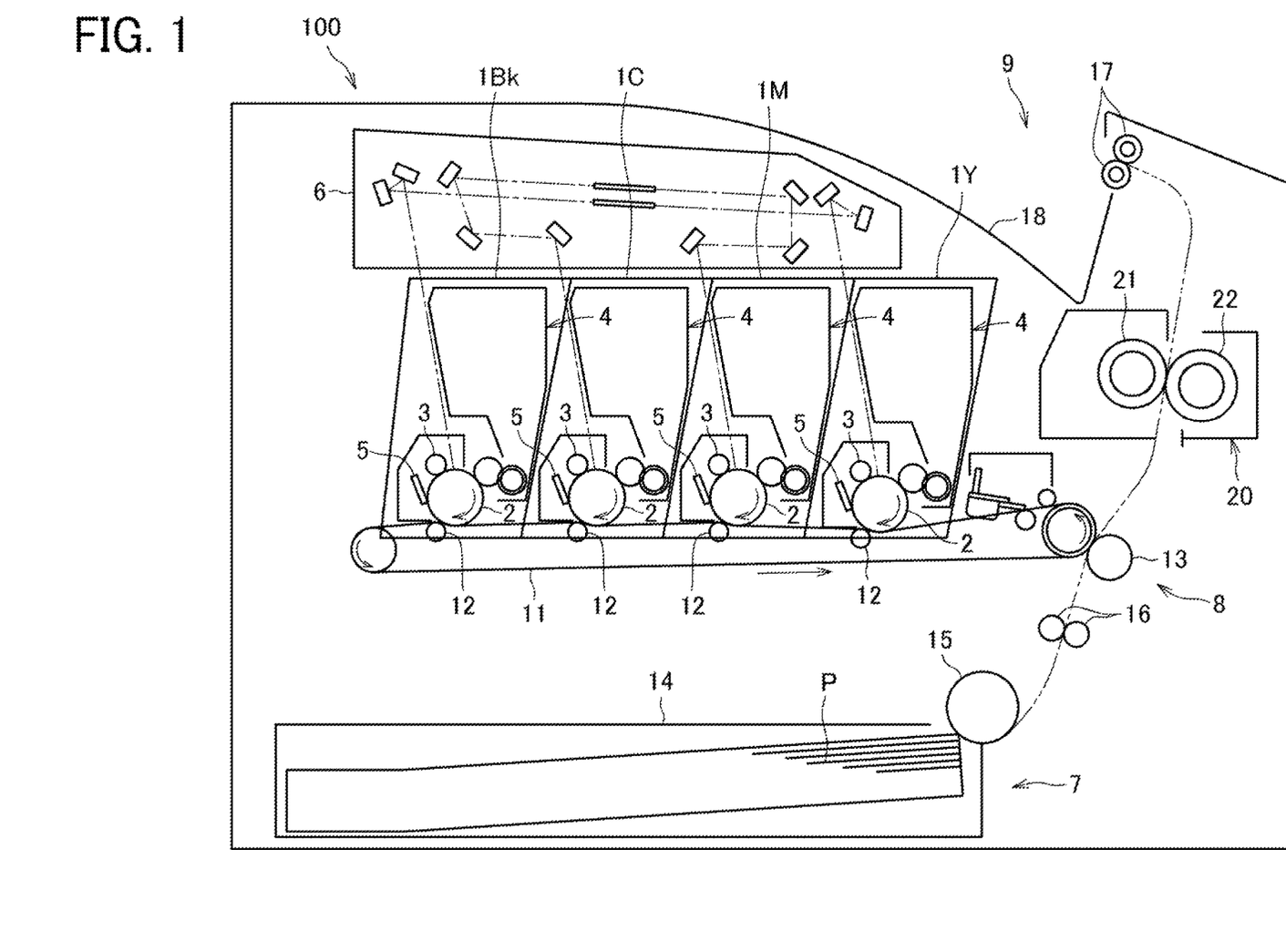
FIG. 1 is a schematic configuration diagram of an image forming apparatus according to an embodiment of the present disclosure.

FIG. 1 is a schematic configuration diagram of an image forming apparatus according to an embodiment of the present disclosure. The "image forming apparatus" herein includes a printer, a photocopier, a facsimile machine, a printing machine, or a multifunction peripheral that is the combination of two or more of these. First, a general configuration and basic operations of the image forming apparatus according to the present embodiment will be described with reference to FIG. 1.

As illustrated in FIG. 1, an image forming apparatus 100 according to the present embodiment includes a plurality of image formation units 1Y, 1M, 1C, and 1Bk, as an image former, an exposure device 6, a transfer device 8, a sheet feeding device 7, a fixing device 20, and a sheet ejection device 9.

Each of the image formation units 1Y, 1M, 1C, and 1Bk has basically the same configuration except that the image formation units 1Y, 1M, 1C, and 1Bk contain respective toners (developers) of different colors of yellow, magenta, cyan, and black corresponding to color separation components of a color image. Specifically, each of the image formation units 1Y, 1M, 1C, and 1Bk includes a photoconductor 2 as an image bearer that bears an image on the surface, a charging member 3 that charges the surface of the photoconductor 2, a developing device 4 that supplies a toner as a developer to the surface of the photoconductor 2 to form a toner image, and a cleaning member 5 that cleans the surface of the photoconductor 2.

The transfer device 8 as a transferor includes an intermediate transfer belt 11, primary transfer rollers 12, and a secondary transfer roller 13. The intermediate transfer belt 11 is an intermediate transferor including an endless-belt member, and is stretched by and hung on a plurality of support rollers. The four primary transfer rollers 12 are provided inside the intermediate transfer belt 11. The primary transfer rollers 12 are in contact with the respective photoconductors 2 via the intermediate transfer belt 11 to form a primary transfer unit (primary transfer nip) between the intermediate transfer belt 11 and each of the photoconductors 2. The secondary transfer roller 13 is in contact with the outer surface of the intermediate transfer belt 11 to form a secondary transfer unit (secondary transfer nip).

The sheet feeding device 7 includes a sheet feeding container 14 that contains sheets P as recording media, and a sheet feeding roller 15 that sends out a sheet P from the sheet feeding container 14. Hereinafter, the "recording media" will be described as the "sheets", but the "recording media" are not limited to the paper (sheets). The "recording media" include not only the paper (sheets) but also sheets for an overhead projector (OHP), fabric, metal sheets, plastic films, or prepreg sheets in which carbon fibers are preliminarily impregnated with a resin. In addition to plain paper, the "sheets" also include thick paper, postcards, envelopes, thin paper, coated paper (coated paper, art paper, and the like), and tracing paper.

The fixing device 20 includes a fixing rotational object 21 heated by a heating source, such as a heater, and a pressure-applying rotational object 22 pressed against an outer curved surface of the fixing rotational object 21 to form a fixing nip.

The sheet ejection device 9 includes a pair of sheet ejection rollers 17.

Next, basic operations of the image forming apparatus 100 according to the present embodiment will be described with reference to FIG. 1.

In response to an instruction to form an image in the image forming apparatus 100, the photoconductors 2 of the image formation units 1Y, 1M, 1C, and 1Bk and the intermediate transfer belt 11 of the transfer device 8 start to rotate. Further, the sheet feeding roller 15 starts to rotate to send out a sheet P from the sheet feeding container 14. The sheet P sent out comes into contact with a pair of timing rollers 16 and thus comes to a standstill, and the conveyance of the sheet P is temporarily stopped until an image to be transferred to the sheet P is formed.

In each of the image formation units 1Y, 1M, 1C, and 1Bk, first, the charging member 3 charges the surface of the photoconductor 2 to a uniform high potential. Next, the exposure device 6 exposes the surfaces (charged surfaces) of the photoconductors 2 on the basis of image information on a document read by a document reading device or printing-image information the printing of which is instructed from a terminal. As a result, the potential of the exposed portion decreases, and an electrostatic latent image is formed on the surface of each of the photoconductors 2. Then the developing device 4 supplies a toner to the electrostatic latent image to form a toner image on each of the photoconductors 2. When the toner images on the respective photoconductors 2 reach the primary transfer units (the positions of the primary transfer rollers 12) as the respective photoconductors 2 rotate, the toner images are sequentially transferred onto the rotating intermediate transfer belt 11 in a superimposed manner.

Thus, a full-color toner image is formed on the intermediate transfer belt 11. Note that any one of the image formation units 1Y, 1M, 1C, and 1Bk may be used to form a single-color image, or any two or three of the image formation units may be used to form a two-color or three-color image. After the toner images are transferred from the photoconductors 2 to the intermediate transfer belt 11, the cleaning members 5 remove residual toner and the like on the respective photoconductors 2.

The toner image transferred onto the intermediate transfer belt 11 is conveyed to the secondary transfer unit (the position of the secondary transfer roller 13) as the intermediate transfer belt 11 rotates, and the toner image is transferred onto the sheet P conveyed by the timing rollers 16. Then the sheet P is conveyed to the fixing device 20.

In the fixing device 20, the toner image on the sheet P is heated and applied a pressure by the fixing rotational object 21 and the pressure-applying rotational object 22, and thus the toner image is fixed to the sheet P. Then the sheet P is conveyed by the sheet ejection rollers 17 and ejected to a sheet ejection tray 18 provided for the main body of the image forming apparatus.

As a result, the series of image forming operations ends.

Figure 2:
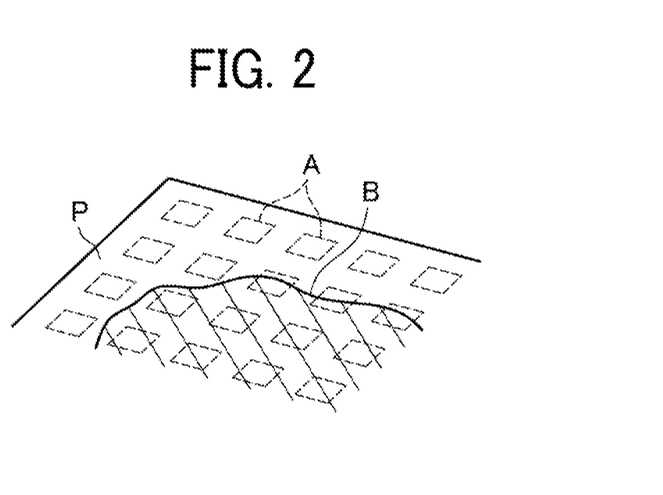
FIG. 2 is a diagram illustrating an example of tracking patterns.

The image forming apparatus according to the present embodiment may form, in addition to an image based on image information obtained from the document reading device or the terminal as described above, tracking patterns for recognizing which apparatus has formed the image. The tracking patterns include, for example, a dot pattern including information, such as the manufacture number, the model name, the serial number, and the copying date and time of each image forming apparatus. Since as illustrated in FIG. 2, tracking patterns A are printed on a sheet P together with an image B originally intended to be formed, the tracking patterns A are generally formed using a toner of a less noticeable color, such as yellow, not to impair the quality of the image B.

Identification patterns, such as tracking patterns, may be formed in a region different from the region of an image originally intended to be formed, or may be formed in such a manner that the identification patterns are superimposed on the image. The inventor has found that in this case, the identification patterns at positions away from the image are less likely to be transferred than the identification patterns at positions superimposed on or adjacent to the image, and thus part of the tracking patterns are likely to be lost.

Figure 3:
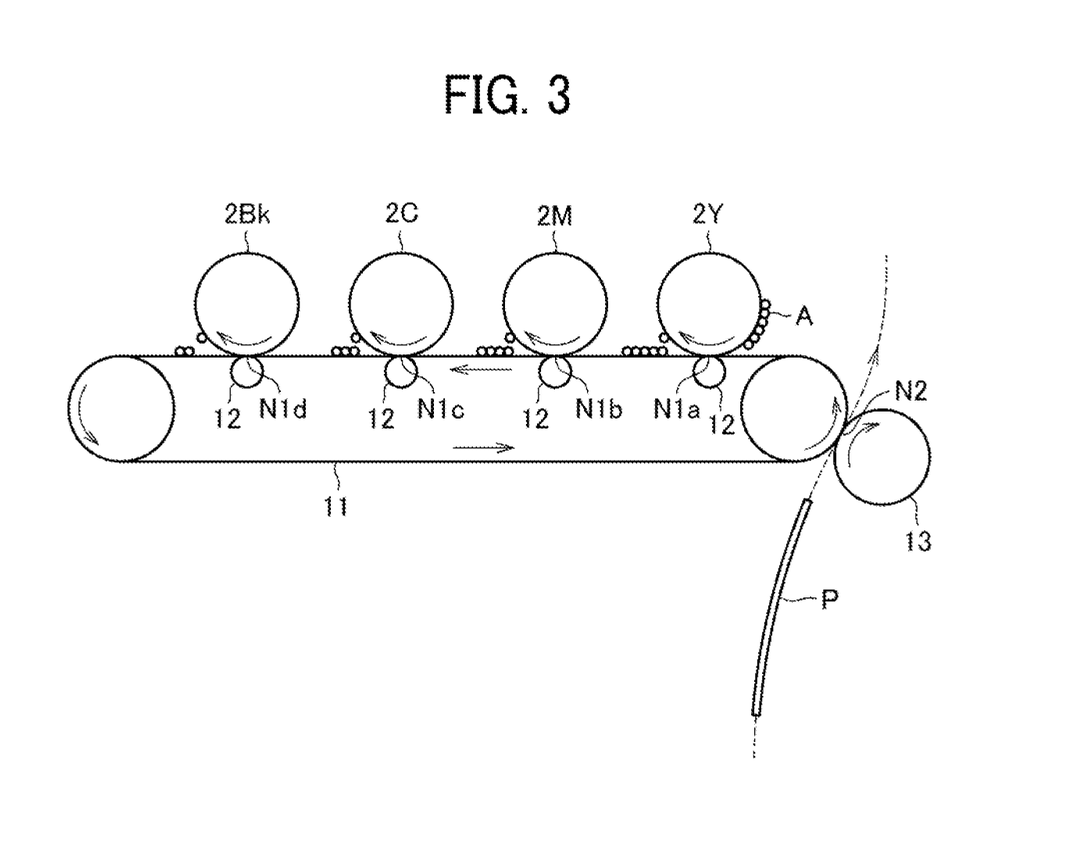
FIG. 3 is a diagram illustrating an example of a case where tracking patterns are formed using a yellow-image photoconductor.

FIG. 3 is a diagram illustrating an example of a case where tracking patterns are formed using the yellow-image photoconductor.

In this case, in response to the document reading device reading image information on a document or in response to a terminal sending image information to the image forming apparatus, the pattern information on the tracking patterns is added to the image information, and tracking patterns A are formed on the photoconductor 2Y together with a yellow image. Then the tracking patterns A are transferred onto the intermediate transfer belt 11 at a primary transfer unit N1a of the yellow-image photoconductor 2Y, then conveyed to a secondary transfer unit N2 as the intermediate transfer belt 11 rotates, and transferred to a sheet P at the secondary transfer unit N2.

Before transferred to the sheet P via the intermediate transfer belt 11, the tracking patterns A formed on the yellow-image photoconductor 2Y pass through, in addition to the primary transfer unit N1a of the yellow-image photoconductor 2Y, primary transfer units N1b, N1c, and N1d of the other respective photoconductors 2M, 2C, and 2Bk. At this time, in each of the primary transfer units N1a, N1b, N1c, and N1d, due to the influence of the friction coefficient between each of the photoconductors 2Y, 2M, 2C, and 2Bk and the intermediate transfer belt 11, and the like, part of the toner on the photoconductor 2Y may not be transferred to the intermediate transfer belt 11 and may remain on the photoconductor 2Y, or part of the toner on the intermediate transfer belt 11 may be reversely transferred to the photoconductor 2M, 2C, or 2Bk. As a result, there is a possibility that the toner finally transferred to the sheet P is partially lost, and the visibility of the tracking patterns A decreases.

Figure 4:
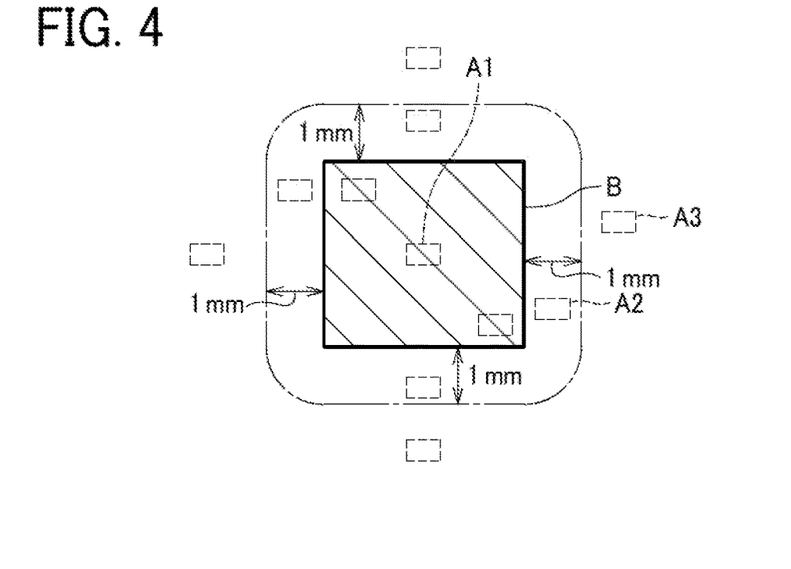
FIG. 4 is a diagram illustrating an example of arrangement of an image originally intended to be formed and tracking patterns.

As described above, there is a possibility that the toner constituting the tracking patterns is partially lost by remaining on the photoconductor or being reversely transferred to the photoconductor as the toner passes through the primary transfer unit. However, it has been found that the partial toner loss of the tracking patterns is likely to occur particularly in the tracking patterns at positions away from an image originally intended to be formed. That is, as illustrated in FIG. 4, the tracking patterns include tracking patterns A1 arranged at positions superimposed on an image B, tracking patterns A2 arranged at positions adjacent to the image B, and tracking patterns A3 arranged at positions away from the image B. In particular, the tracking pattern A3 arranged at positions away from the image B are likely to suffer from partial toner loss as compared with the tracking patterns A1 arranged at positions superimposed on the image B and the tracking patterns A2 arranged at positions adjacent to the image B. The positions adjacent to the image B mean a range within 1 mm or less outward from the periphery of the image B.

Figure 5A:
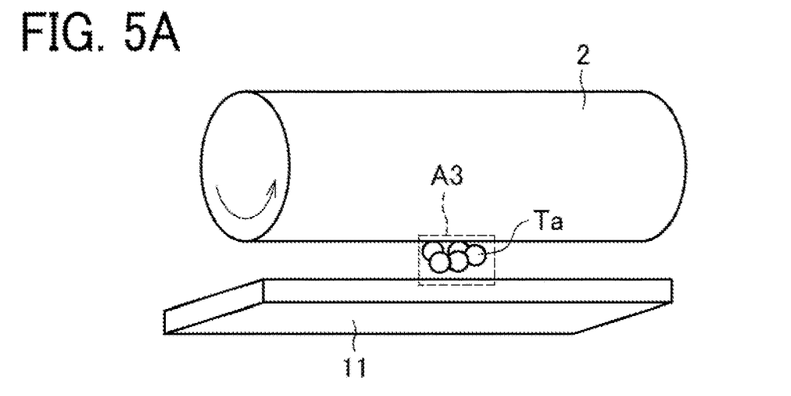
FIGS. 5A and 5B are diagrams illustrating states in which a tracking pattern at a position away from an image is transferred to an intermediate transfer belt.
Figure 5B:
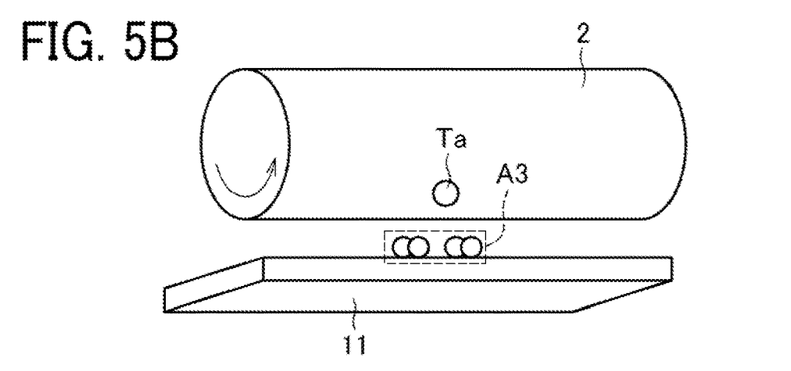

The cause that the partial toner loss is likely to occur in the tracking patterns at positions away from the image is as follows:

Since as illustrated in FIG. 5A, toner constituting an image does not exist around a tracking pattern A3 at a position away from the image, a local stress is applied to toner Ta constituting the tracking pattern A3 when the tracking pattern A3 is transferred from the photoconductor 2 to the intermediate transfer belt 11 or passes through the primary transfer unit. Thus, the toner Ta aggregates. Consequently, since as illustrated in FIG. 5B, part of the toner Ta adheres to a surface of the photoconductor 2, the toner Ta is not completely transferred from the photoconductor 2 to the intermediate transfer belt 11, or conversely, the toner Ta is reversely transferred from the intermediate transfer belt 11 to the photoconductor 2. Thus, the toner Ta of the tracking pattern A3 is partially lost. In addition, in a case where the friction coefficient of the photoconductor 2 is larger than the friction coefficient of the intermediate transfer belt 11, the toner Ta of the tracking pattern A3 is likely to be partially lost.

Figure 6A:
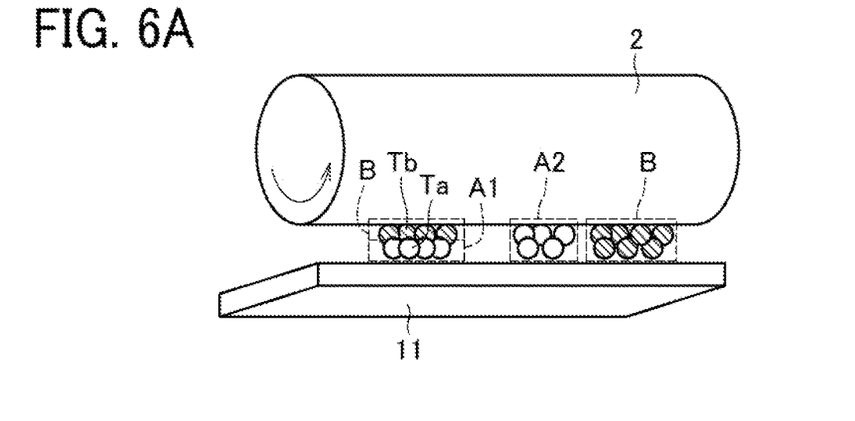
FIGS. 6A and 6B are diagrams illustrating states in which a tracking pattern at a position superimposed on or adjacent to an image is transferred to an intermediate transfer belt.
Figure 6B:
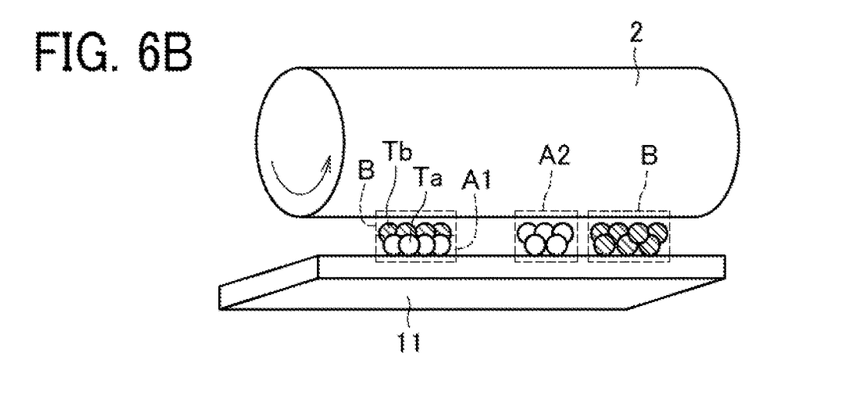

On the other hand, as illustrated in FIG. 6A, toner Tb constituting an image B exists around tracking patterns A1 and A2 at positions superimposed on the image B or positions adjacent to the image B. Therefore, even if a local stress is applied to toner Ta constituting each of the tracking patterns A1 and A2, the stress is dispersed to the toner Tb of the image B. Therefore, the toner Ta of each of the tracking patterns A1 and A2 is less likely to aggregate. Consequently, as illustrated in of FIG. 6B, adhesion (remaining) of the toner Ta to the photoconductor 2 is suppressed, and each of the tracking patterns A1 and A2 is relatively satisfactorily transferred to the intermediate transfer belt 11.

Although exemplified is a case where among the plurality of photoconductors 2Y, 2M, 2C, and 2Bk, the tracking patterns A are formed on the yellow-image photoconductor 2Y arranged most upstream in the moving direction (rotation direction) of the intermediate transfer belt 11 the starting point of which is the secondary transfer unit N2, the occurrence of the phenomenon of the above-described partial toner loss is not limited to this example. Therefore, even in a case where tracking patterns A are formed on the photoconductor except the photoconductor most upstream, tracking patterns A3 at positions away from an image B tend to be more likely to suffer from partial toner loss than tracking patterns A1 and A2 at positions superimposed on or adjacent to the image B by the mechanism the same as the mechanism described above.

Since as described above, the degree of the partial toner loss of the tracking pattern varies depending on whether the formation place of the tracking pattern is at a position superimposed on or adjacent to the image, or is at a position away from the image, the image forming apparatus according to the present embodiment performs the following control considering such circumstances. Hereinafter, a method for controlling at a time of the formation of tracking patterns in the present embodiment will be described.

Figure 7:
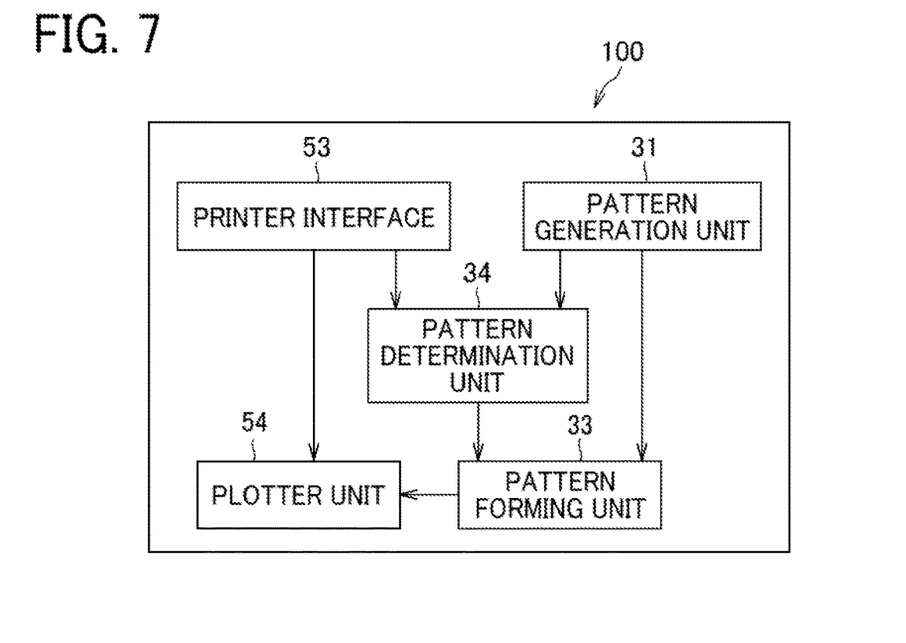
FIG. 7 is a block diagram illustrating a configuration of the image forming apparatus according to the present embodiment.

FIG. 7 is a block diagram illustrating a configuration of the image forming apparatus according to the present embodiment.

As illustrated in FIG. 7, the image forming apparatus 100 according to the present embodiment includes a printer interface 53 as an image information acquisition unit, a pattern generation unit 31, a plotter unit 54 as an image forming unit, a pattern forming unit 33, and a pattern determination unit 34.

The printer interface 53 acquires image information from the document reading device or a terminal. The acquired image information is sent from the printer interface 53 to the plotter unit 54 and the pattern determination unit 34.

On the basis of identification information, such as the manufacture number, for recognizing the image forming apparatus, the pattern generation unit 31 generates a pattern preliminarily associated with the identification information. Information on the generated pattern is sent from the pattern generation unit 31 to the pattern forming unit 33 and the pattern determination unit 34.

On the basis of the information on the input image obtained from the printer interface 53, the plotter unit 54 forms an image on a sheet using each of the image formation units 1Y, 1M, 1C, and 1Bk and the exposure device 6. The plotter unit 54 also forms an image in which the input image and tracking patterns are superimposed.

On the basis of the information on the pattern obtained from the pattern generation unit 31 and a determination result of the pattern determination unit 34, the pattern forming unit 33 forms tracking patterns. Since in the present embodiment, the tracking patterns are formed using a yellow toner, the tracking patterns are superimposed on the yellow input image, and sent as new image information to the plotter unit 54. Then, the superimposed image is formed on a sheet by the exposure device 6, and the image formation unit 1Y that generates a yellow image.

On the basis of the information on the input image obtained from the printer interface 53, and the information on the pattern obtained from the pattern generation unit 31, the pattern determination unit 34 determines the positions of the tracking patterns with respect to the image. Specifically, the pattern determination unit 34 determines whether the tracking pattern is the tracking pattern A1 arranged at a position superimposed on the image B illustrated in FIG. 4, the tracking pattern A2 arranged at a position adjacent to the image B, or the tracking pattern A3 arranged at a position away from the image B. Hereinafter, the tracking pattern A1 arranged at a position superimposed on the image B and the tracking pattern A2 arranged at a position adjacent to the image B will be collectively referred to as an "image portion pattern", and the tracking pattern A3 arranged at a position away from the image B will be referred to as a "non-image portion pattern".

According to the present disclosure, the image portion pattern (the tracking pattern A1 or A2 arranged at a position superimposed on or adjacent to the image B) includes a tracking pattern arranged at a position superimposed on the image B or in a range within 1 mm or less outward from the periphery of the image B (see FIG. 4). On the other hand, the non-image portion pattern (the tracking pattern A3 arranged at a position away from the image B) means a tracking pattern arranged more outside than positions 1 mm away from the periphery of the image B. Note that the image B may not be a rectangular solid image as illustrated in FIG. 4.

As described above, in the present embodiment, the pattern determination unit 34 determines whether a tracking pattern is the image portion pattern or the non-image portion pattern. That is, it is determined whether a tracking pattern is a pattern that is less likely to suffer from partial toner loss or a pattern that is likely to suffer from partial toner loss. Then, on the basis of the result, in the present embodiment, the size of the tracking pattern (the area of the tracking pattern) is varied.

Figure 8A:
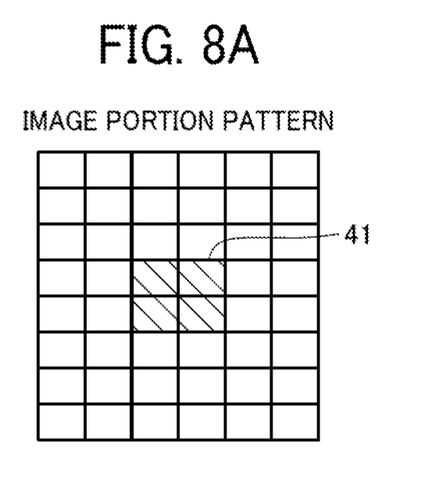
FIGS. 8A and 8B are diagrams illustrating examples of an image portion pattern and a non-image portion pattern.
Figure 8B:
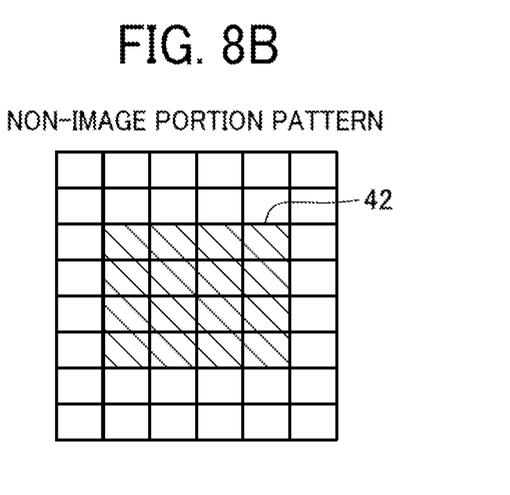

FIGS. 8A and 8B illustrate examples of a case where a tracking pattern is an image portion pattern and a case where a tracking pattern is a non-image portion pattern.

The tracking pattern illustrated in FIG. 8A is an image portion pattern 41, and in this case, the image portion pattern 41 includes four dots. On the other hand, a non-image portion pattern 42 illustrated in FIG. 8B includes 16 dots having the same dot size as the dot size of the image portion pattern 41. As described above, in the present embodiment, the number of dots constituting the non-image portion pattern 42 is made larger than the number of dots constituting the image portion pattern 41, so that the non-image portion pattern 42 is formed larger (in area) than the image portion pattern 41. That is, since the non-image portion pattern 42 is a tracking pattern arranged at a position away from the image, and is more likely to suffer from partial toner loss in the primary transfer units than the image portion pattern 41 is, the non-image portion pattern 42 is formed larger than the image portion pattern 41. As a result, even if part of the toner constituting the non-image portion pattern 42 is lost, the visibility of the non-image portion pattern 42 is satisfactorily ensured.

Figure 9A:
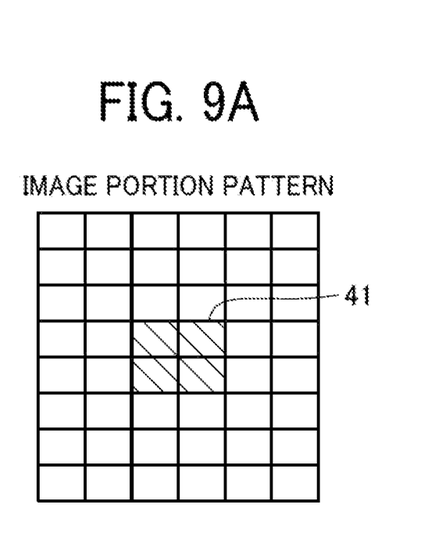
FIGS. 9A and 9B are diagrams illustrating other examples of an image portion pattern and a non-image portion pattern.
Figure 9B:
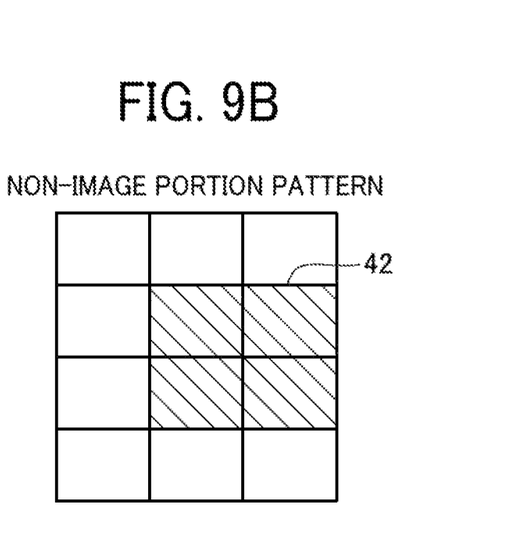

Alternatively, as in other examples illustrated in FIGS. 9A and 9B, the dot size may be varied without varying the number of dots, so that the sizes of an image portion pattern 41 and a non-image portion pattern 42 are made different. In this example, the image portion pattern 41 illustrated in FIG. 9A includes four dots of a smaller size, whereas the non-image portion pattern 42 illustrated in FIG. 9B includes four dots of a larger size. The dot size is varied by adjusting the spot diameter of exposure light emitted from the exposure device to the photoconductor. As described above, since in the case of the examples illustrated in FIGS. 9A and 9B, the non-image portion pattern 42 is also formed larger than the image portion pattern 41, the visibility of the non-image portion pattern 42 is satisfactorily ensured.

The shapes, the numbers of dots, and the dot sizes of an image portion pattern 41 and a non-image portion pattern 42 are not limited to the examples illustrated in FIGS. 8A to 9B, and are appropriately varied.

As described above, a non-image portion pattern 42 that is likely to suffer from partial toner loss is formed relatively large, whereas an image portion pattern 41 that is less likely to suffer from partial toner loss is formed relatively small. However, even in an image portion pattern 41 that is relatively less likely to suffer from partial toner loss, the lower the density (gradation) of an image superimposed on or adjacent to the image portion pattern 41, the less the toner (the image) existing around the image portion pattern 41. Therefore, the image portion pattern 41 is likely to suffer from partial toner loss.

Figure 10:
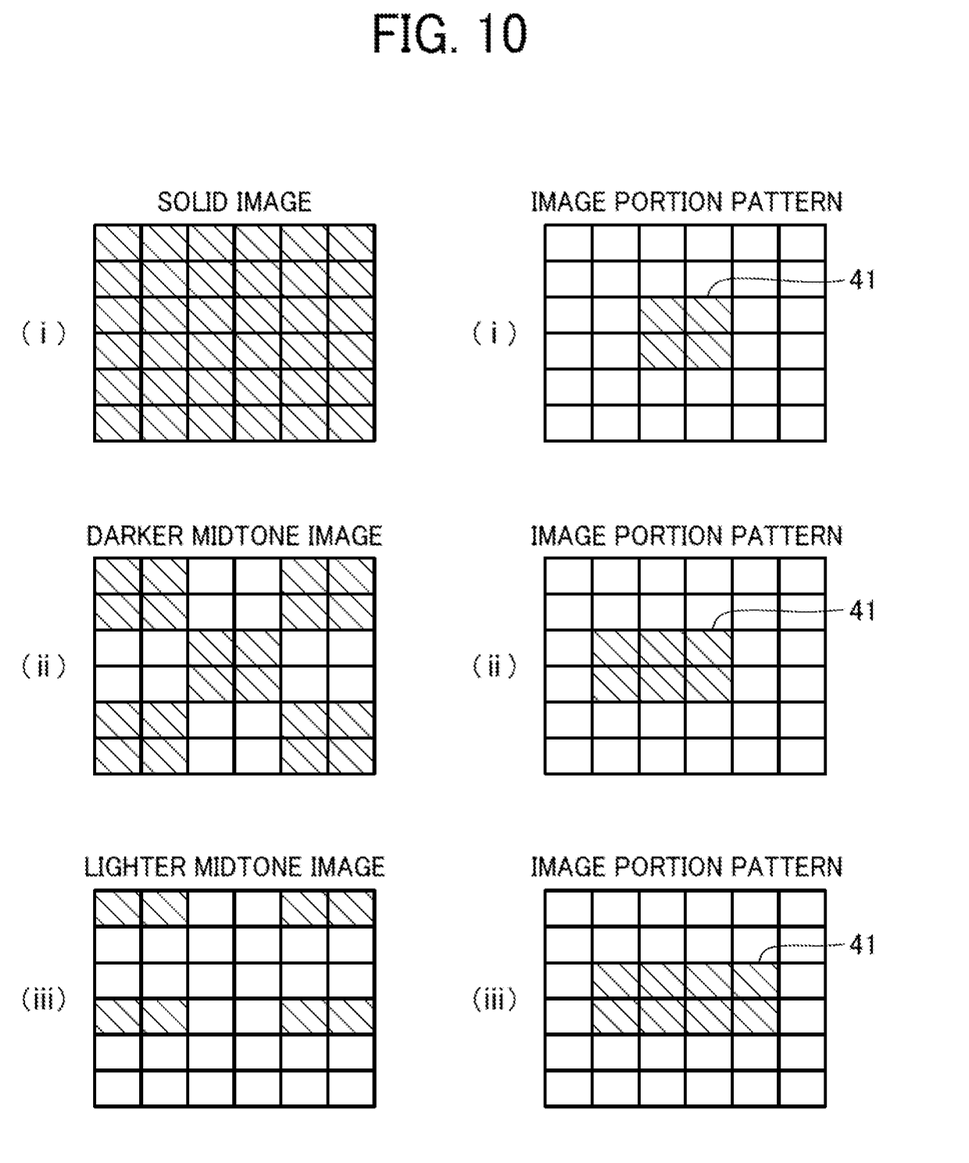
FIG. 10 is a diagram illustrating an example in which the sizes of image portion patterns are varied according to the densities of images.

Accordingly, as illustrated in FIG. 10, the size of an image portion pattern 41 may be varied according to the density (gradation) of an image superimposed on or adjacent to the image portion pattern 41. In this example, since a darker midtone image illustrated in (ii) of FIG. 10 has a lower density than the density of a solid image illustrated in (i) of FIG. 10, an image portion pattern 41 is made larger. In the case of a lighter midtone image illustrated in (iii) of FIG. 10, an image portion pattern 41 is made further larger. The size of an image portion pattern 41 may be varied by varying the number of dots constituting the image portion pattern 41 or by varying the dot size.

As described above, the lower the density (gradation) of an image superimposed on or adjacent to an image portion pattern 41, the larger (in area) the image portion pattern 41 is formed, so that the visibility of the image portion pattern 41 is satisfactorily ensured. On the contrary, the higher the density (gradation) of an image superimposed on or adjacent to an image portion pattern 41, the smaller the image portion pattern 41 is formed, so that the consumption of toner constituting the tracking pattern is reduced.

In addition, partial toner loss hardly occurs in an image portion pattern 41, but the possibility of partial toner loss in the image portion pattern 41 varies depending on which photoconductor an image superimposed on or adjacent to the image portion pattern 41 is formed on. This will be described on the basis of an example illustrated in FIG. 3.

In the example illustrated in FIG. 3, the yellow-image photoconductor 2Y, the magenta-image photoconductor 2M, the cyan-image photoconductor 2C, and the black-image photoconductor 2Bk align in this order from the upstream side of the moving direction (rotation direction) of the intermediate transfer belt 11 the starting point of which is the secondary transfer unit N2. In a case where in such a configuration, tracking patterns A and an image superimposed on or adjacent to the tracking patterns A are both formed on the most upstream yellow-image photoconductor 2Y, the tracking patterns A and the image are superimposed on or adjacent to each other on the most upstream yellow-image photoconductor 2Y, and the tracking patterns A and the image in this state pass through the primary transfer units N1*a*, N1*b*, N1*c*, and N1*d* of the four respective photoconductors 2Y, 2M, 2C, and 2Bk. However, in a case where an image on which or to which tracking patterns A are superimposed or adjacent is formed on the magenta-image photoconductor 2M downstream from and next to the yellow-image photoconductor 2Y, the tracking patterns A and the image superimposed on or adjacent to each other pass through the three primary transfer units from the primary transfer unit N1*b* of the magenta-image photoconductor 2M to the primary transfer unit N1*d* of the black-image photoconductor 2Bk. Considering in the same manner, in a case where an image on which or to which tracking patterns A are superimposed or adjacent is formed on the cyan-image photoconductor 2C further closer to the downstream side, the tracking patterns A and the image superimposed on or adjacent to each other pass through the further-reduced two primary transfer units. As described above, as the photoconductor on which an image superimposed on or adjacent to image portion patterns 41 is formed is the photoconductor located closer the downstream side, the number of the primary transfer units through which tracking patterns A superimposed on or adjacent to the image pass decreases. Therefore, the toner constituting the tracking patterns A is likely to aggregate, and the partial toner loss of the tracking patterns A is likely to occur.

Figure 11:
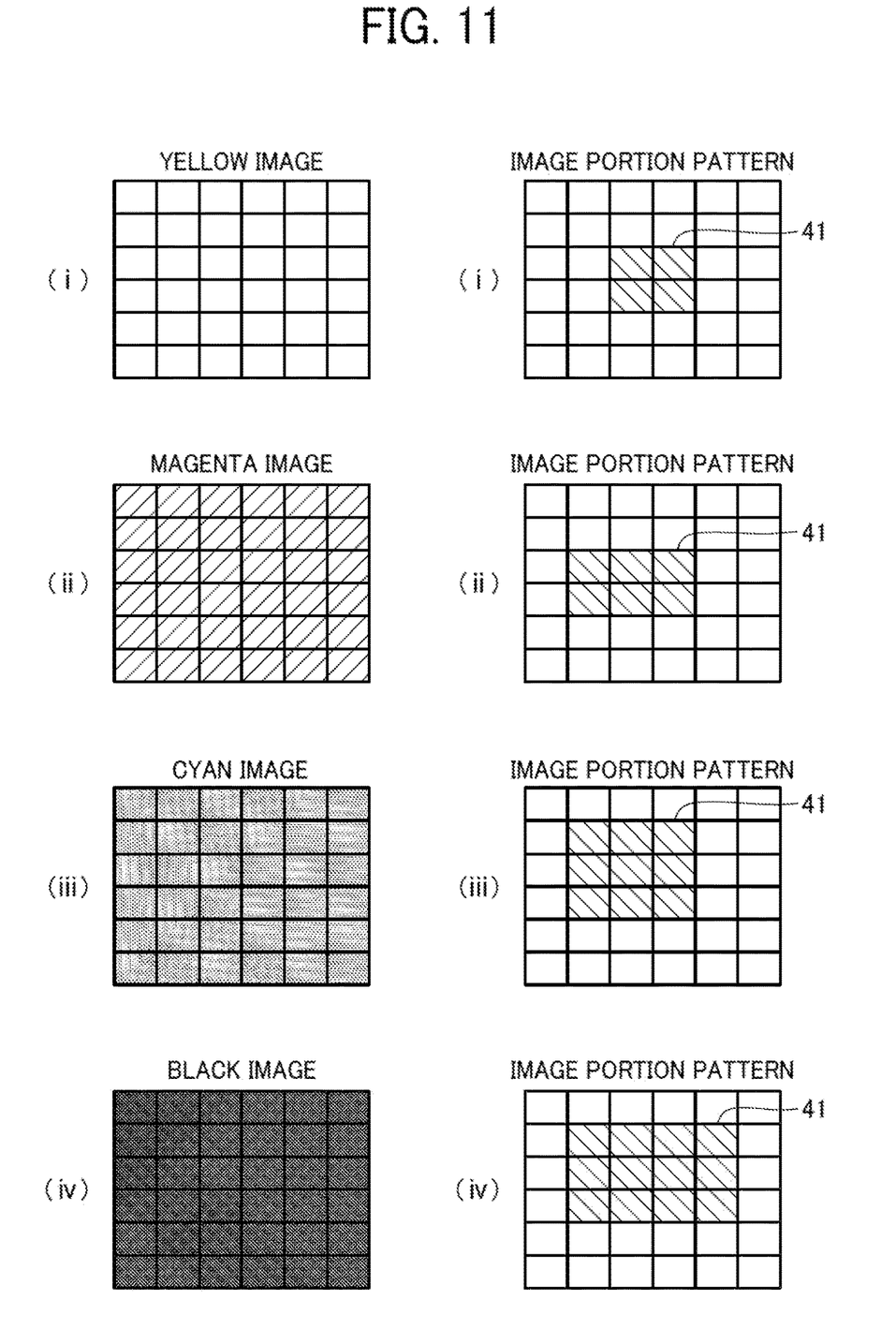

Therefore, as illustrated in FIG. 11, the size of tracking patterns (image portion patterns 41) may be varied depending on which photoconductor is the photoconductor on which an image superimposed on or adjacent to the tracking patterns is formed. That is, as illustrated in (i) to (iv) in FIG. 11, as an image superimposed on or adjacent to tracking patterns (image portion patterns 41) is an image formed on the photoconductor closer to the downstream side, in the order of yellow, magenta, cyan, and black, the tracking patterns (image portion patterns 41) are made larger. Also in this case, the size of the image portion patterns 41 may be varied by varying the number of dots constituting the image portion patterns 41 or by varying the dot size.

As described above, as an image superimposed on or adjacent to image portion patterns 41 is an image formed on the photoconductor located closer to the downstream side, the image portion patterns 41 are formed larger. Thus, the visibility of the image portion patterns 41 is satisfactorily ensured. On the contrary, as an image superimposed on or adjacent to image portion patterns 41 is an image formed on the photoconductor located closer to the upstream side, the image portion patterns 41 are formed smaller. Thus, the consumption of toner constituting the tracking patterns is reduced.

Figure 12:
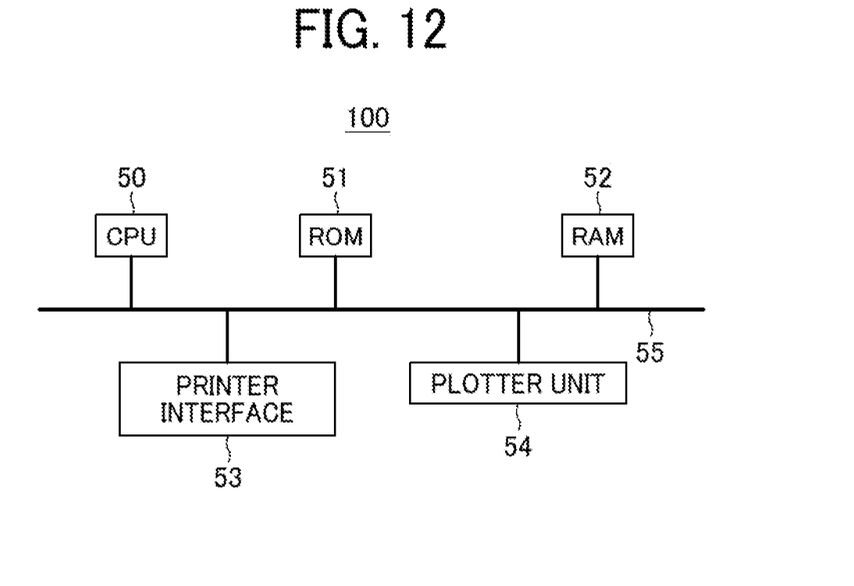
FIG. 12 is a block diagram illustrating a hardware configuration of the image forming apparatus according to the present embodiment.

FIG. 12 is a block diagram illustrating a hardware configuration of the image forming apparatus 100 according to the present embodiment.

As illustrated in FIG. 12, the image forming apparatus 100 according to the present embodiment includes a central processing unit (CPU) 50, a read only memory (ROM) 51, a random access memory (RAM) 52, the printer interface 53, the plotter unit 54, and a bus line 55 that electrically couples these components.

The CPU 50 controls image forming operations of the image forming apparatus 100. The ROM 51 as a storage device stores programs and the like used to drive the CPU 50. The RAM 52 is a storage device different from the ROM 51, and includes a static random access memory (SRAM) that temporarily stores information being processed by the CPU 50, and a non-volatile random access memory (NVRAM) that stores information, such as parameters or tables, necessary for various types of control in a nonvolatile manner. The RAM 52 also temporarily accumulates input image data for image processing. The printer interface 53 is an interface circuit that receives printing data input into the image forming apparatus 100 from an external computer. The plotter unit 54 is a printing unit for superimposing tracking patterns processed by the image forming apparatus 100, on image data input from the printer interface 53 to make an output image, and forming the output image on a sheet.

Figure 13:
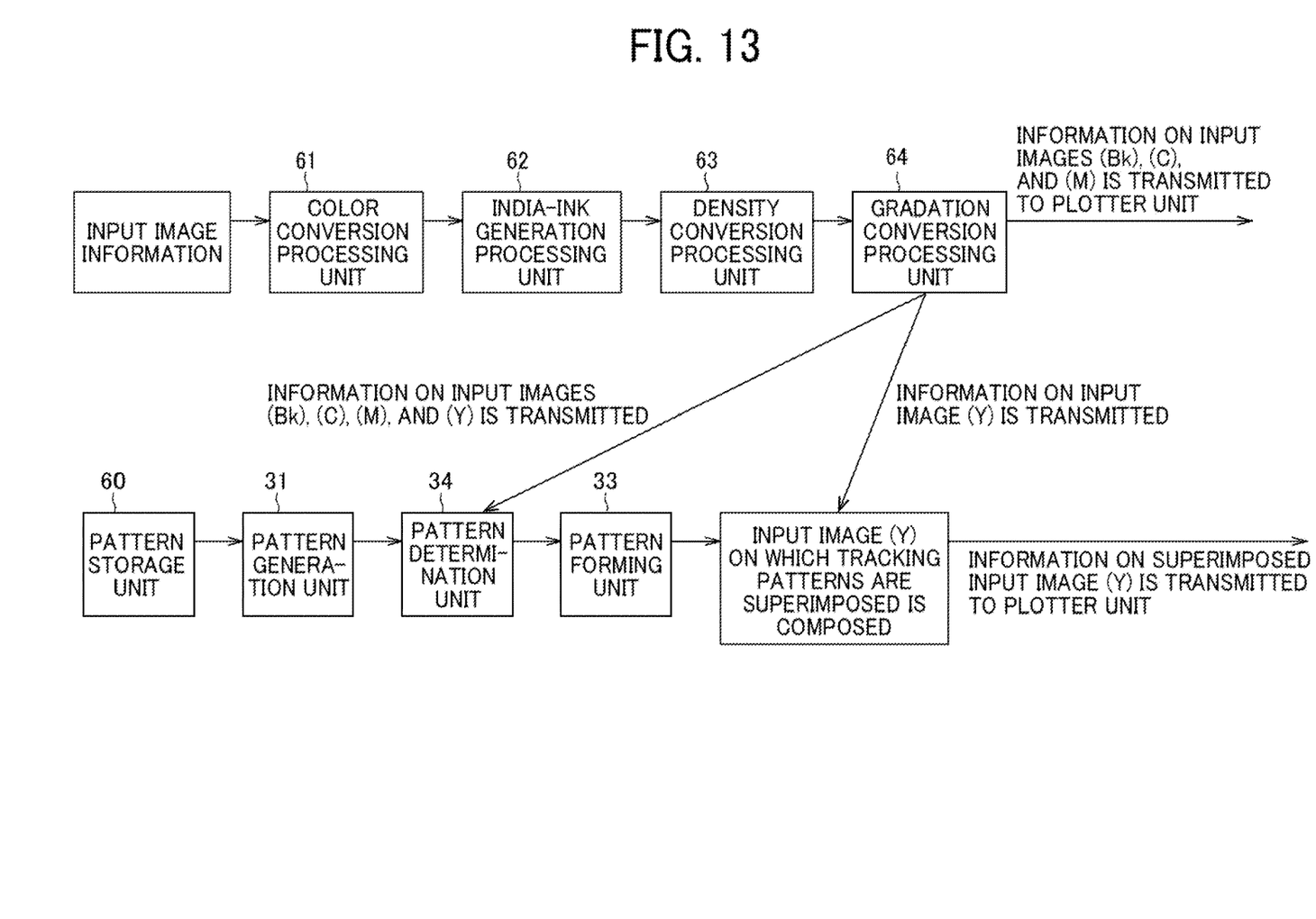
FIG. 13 is a functional block diagram illustrating a flow of image processing in the image forming apparatus according to the present embodiment.

FIG. 13 is a block diagram illustrating a flow of image processing in the image forming apparatus 100 according to the present embodiment. On the basis of various image processing programs and processing parameters read from the ROM 51 and the RAM 52, the CPU 50 performs image data processing on image data input from the printer interface 53 and accumulated in the RAM 52, to execute various types of image processing on image data illustrated in FIG. 13.

Input image information illustrated in FIG. 13 is image data that is for printing output and is input into the image forming apparatus 100 via the printer interface 53. The image data is first sent to a color conversion processing unit 61, and the color conversion processing unit 61 performs color conversion processing to convert the image information from the red, green, and blue (RGB) model to the cyan, magenta, and yellow (CMY) model. Next, an India-ink generation processing unit 62 generates black image information (Bk), and image information for the respective colors C, M, Y, and Bk is formed. Then, a density conversion processing unit 63 performs density conversion processing on the image information on the basis of preliminarily stored density correction tables for the respective colors, and subsequently, a gradation conversion processing unit 64 performs gradation conversion processing on the image information. The image data of C, M, and Bk that has undergone the gradation conversion processing is transmitted, as output image data, to the plotter unit 54.

In addition, as illustrated in FIG. 13, tracking patterns are read as pattern information to be superimposed on an output image by the pattern generation unit 31 on the basis of information preliminarily stored in a pattern storage unit 60 provided in the ROM 51, and are sent to the pattern determination unit 34. On the basis of the pattern information and the image information for the respective colors C, M, Y, and Bk sent from the gradation conversion processing unit 64, the pattern determination unit 34 determines the positions of the tracking patterns for the images of the respective colors.

That is, it is determined whether the tracking pattern is an image portion pattern arranged at a position superimposed on or adjacent to the image, or a non-image portion pattern arranged at a position away from the image. Then, on the basis of the determination result of the pattern determination unit 34, the pattern forming unit 33 forms the tracking patterns corresponding to the image portion pattern or the non-image portion pattern. Since in the case of the example of the present embodiment, the tracking patterns are formed using the yellow toner, the information on the tracking patterns formed by the pattern forming unit 33 is superimposed on the yellow image information Y generated by the gradation conversion processing unit 64, and sent, as new yellow image information Y, to the plotter unit 54. The plotter unit 54 forms an output image on the basis of the image information for C, M, and Bk transmitted from the gradation conversion processing unit 64, and the yellow image information Y in which the tracking pattern information is superimposed on the yellow image information transmitted from the gradation conversion processing unit 64.

FIGS. 14A to 14E are diagrams simply illustrating image information used by the pattern determination unit 34 according to the present embodiment.

Figures 14A, 14B:
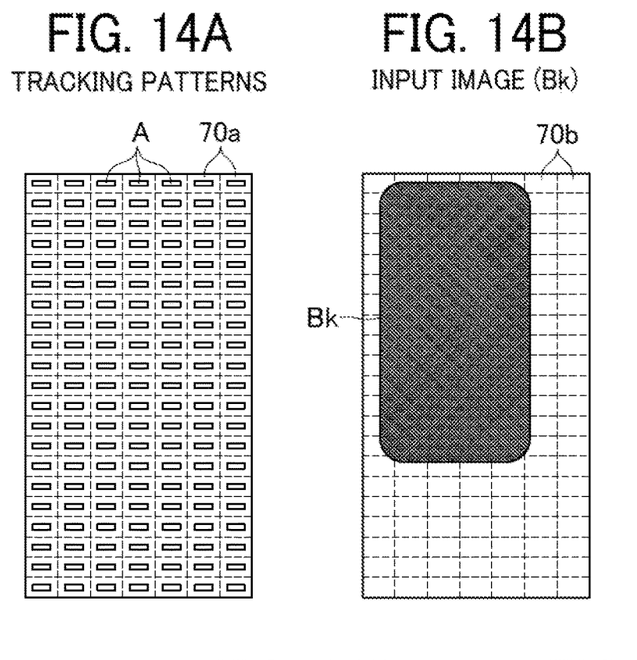
FIGS. 14A to 14E are diagrams simply illustrating image information used in a pattern determination unit according to the present embodiment.
Figure 14C:
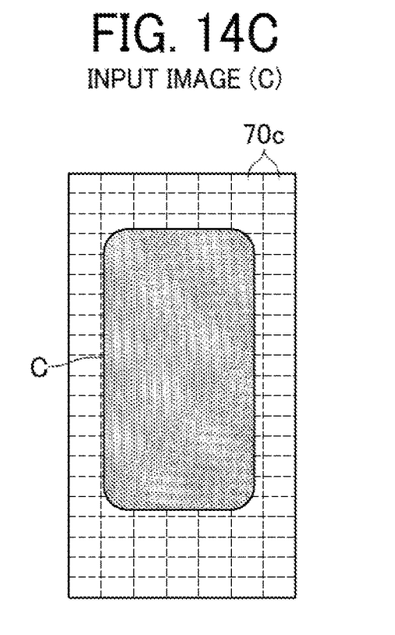
Figure 14D:
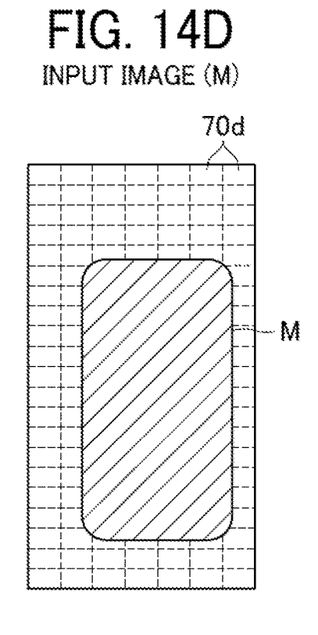
Figure 14E:
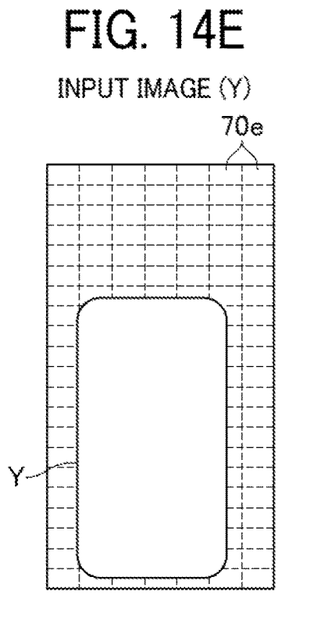

As illustrated in FIG. 14A, in the present embodiment, tracking patterns A are formed in such a manner the tracking patterns A disperse over an entire region where an image is formed. Therefore, in the present embodiment, in order to determine whether or not input images of the respective colors (Bk), (C), (M), and (Y) exist at a position superimposed on or adjacent to each tracking pattern A, regions 70a including the vicinities of the respective tracking patterns A are set for the respective tracking patterns A, and the pattern determination unit 34 determines whether or not the regions 70a include the input images of the respective colors (Bk), (C), (M), and (Y). Specifically, as illustrated in FIGS. 14B to 14E, regions 70b to 70e corresponding to the regions 70a of the respective tracking patterns A are set for each of the input images of the respective colors (Bk), (C), (M), and (Y), and it is determined whether or not the input images of the respective colors (Bk), (C), (M), and (Y) exist in each of the regions 70b to 70e.

Figure 15:
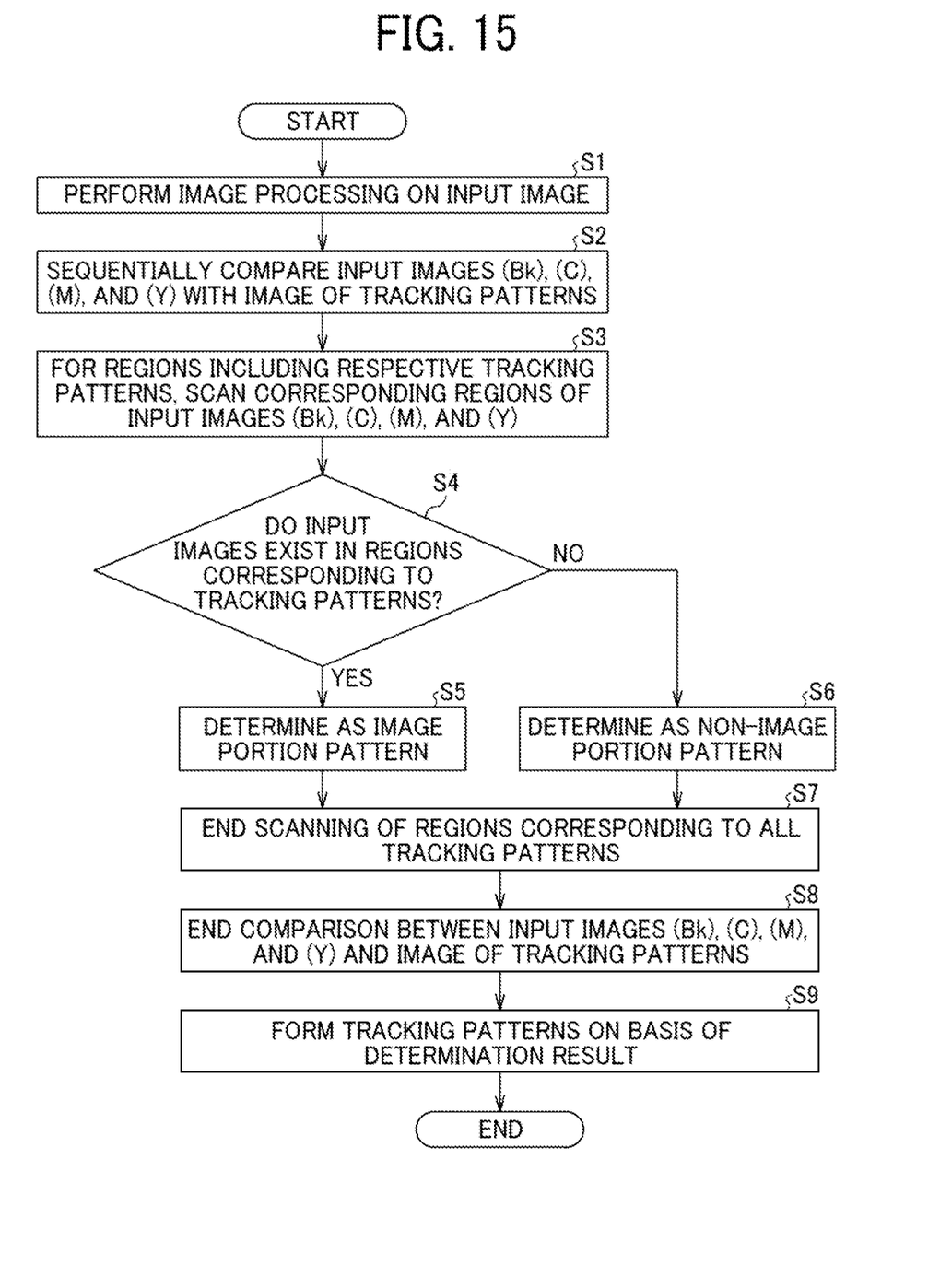
FIG. 15 is a flowchart of tracking-pattern determination processing by a pattern determination unit according to the present embodiment.

FIG. 15 is a flowchart of tracking-pattern determination processing by the pattern determination unit 34 according to the present embodiment.

As illustrated in FIG. 15, in the present embodiment, after the color conversion processing unit 61, the India-ink generation processing unit 62, the density conversion processing unit 63, and the gradation conversion processing unit 64 perform the image processing on the input image, the input images of the respective colors (Bk), (C), (M), and (Y) are sequentially compared with an image of the tracking patterns. That is, for each of the regions 70a including the respective tracking patterns A illustrated in FIG. 14A, the regions 70b to 70e of the input images of the respective colors (Bk), (C), (M), and (Y) corresponding to the respective regions 70a are scanned. Then, it is determined whether or not the input images of the respective colors (Bk), (C), (M), and (Y) exist in the regions 70b to 70e of the input images of the respective colors (Bk), (C), (M), and (Y). Consequently, in a case where the input image exists, it is determined that the tracking pattern A corresponding to the region is an image portion pattern, or in a case where no input image exists, it is determined that the tracking pattern A corresponding to the region is a non-image portion pattern.

When the scanning of the regions 70b to 70e of the input images of the respective colors (Bk), (C), (M), and (Y) corresponding to all the tracking patterns ends, the comparison between the input images of the respective colors (Bk), (C), (M), and (Y) and the image of the tracking patterns is ended. As a result, it is determined whether each of all the tracking patterns is the image portion pattern or the non-image portion pattern. Then, on the basis of the determination result, the pattern forming unit 33 forms the tracking patterns corresponding to the image portion pattern or the non-image portion pattern.

Although the embodiments of the present disclosure have been described above, the present disclosure is not limited to the above-described embodiments, and is appropriately changed without departing from the gist of the disclosure.

Figure 16:
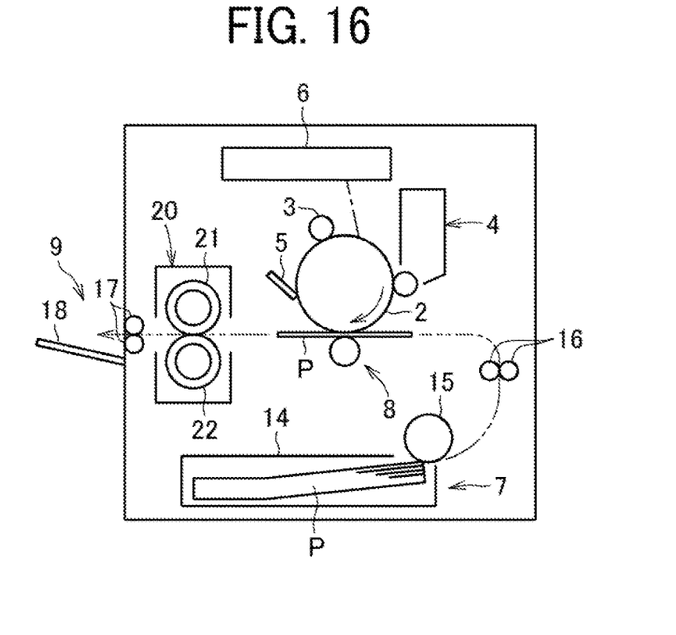
FIG. 16 is a diagram illustrating a configuration of a direct-transfer image forming apparatus including only one photoconductor.
Figure 17:
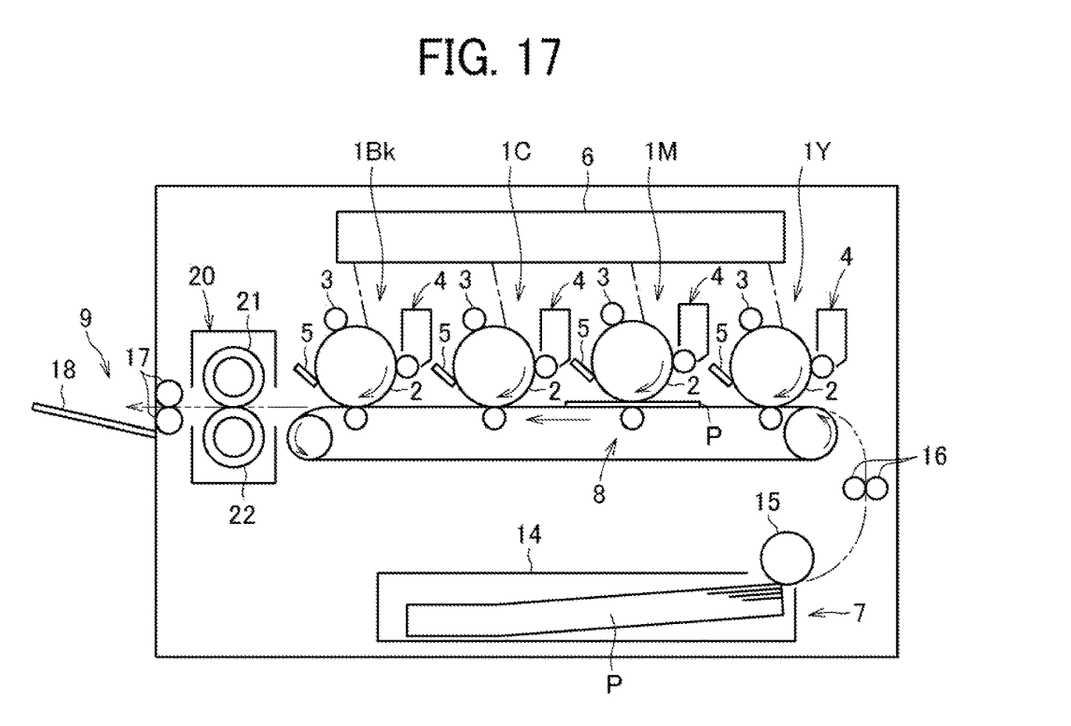
FIG. 17 is a diagram illustrating a configuration of a direct-transfer image forming apparatus including a plurality of photoconductors.

The present disclosure is not only applied to the color image forming apparatus that indirectly transfers images on the plurality of photoconductors 2 onto a sheet P via the intermediate transfer belt 11, as illustrated in FIG. 1, but also may be applied to a monochrome image forming apparatus that includes only one photoconductor 2 and directly transfers an image on the photoconductor 2 onto a sheet P not via an intermediate transfer belt, as illustrated in FIG. 16. Furthermore, the present disclosure may also be applied to an image forming apparatus that directly transfers images on a plurality of photoconductors 2 onto a sheet P, as illustrated in FIG. 17. With respect to such image forming apparatuses, the visibility of a pattern image (identification pattern) also varies depending on whether the pattern image (identification pattern) is an image portion pattern arranged at a position superimposed on an image or a position adjacent to the image, or a non-image portion pattern arranged at neither a position superimposed on the image nor a position adjacent to the image. Therefore, adopting the present disclosure satisfactorily ensures the visibility of the non-image portion pattern in particular.

The present disclosure is not only applied to an image forming apparatus that forms tracking patterns for recognizing which apparatus has formed the image, but also may be applied to an image forming apparatus that forms identification patterns for other applications.

As summaries of the above-described aspects of the present disclosure, the present disclosure includes an image forming apparatus having at least the following configurations.

First Configuration

A first configuration is an image forming apparatus including: an image bearer that bears an image and an identification pattern; an image forming unit that forms the image on the image bearer; a pattern forming unit that forms the identification pattern on the image bearer; a transfer unit that directly or indirectly transfers the image and the identification pattern on the image bearer to a recording medium; and a pattern determination unit that determines whether the identification pattern is an image portion pattern arranged at a position superimposed on the image or a position adjacent to the image, or a non-image portion pattern arranged at neither a position superimposed on the image nor a position adjacent to the image, in which the non-image portion pattern is formed larger than the image portion pattern.

Second Configuration

A second configuration is the first configuration of the image forming apparatus in which the number of dots constituting the identification pattern is increased to form the non-image portion pattern larger than the image portion pattern.

Third Configuration

A third configuration is the first configuration of the image forming apparatus in which dots constituting the identification pattern are enlarged to form the non-image portion pattern larger than the image portion pattern.

Fourth Configuration

A fourth configuration is any one of the first to third configurations of the image forming apparatus in which the image portion pattern is formed larger as the density of the image superimposed on or adjacent to the image portion pattern is lower.

Fifth Configuration

A fifth configuration is any one of the first to fourth configurations of the image forming apparatus in which the image bearer includes a plurality of image bearers, images on the plurality of image bearers are sequentially transferred to a recording medium, or are sequentially transferred to an intermediate transfer object and then transferred to the recording medium, among the plurality of image bearers, the identification pattern is formed on the image bearer located most upstream in a moving direction of the recording medium or the intermediate transfer object, and the image portion pattern is formed larger as the image superimposed on or adjacent to the image portion pattern is an image formed on the image bearer located closer to the downstream side of the moving direction of the recording medium or the intermediate transfer object.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
 an image bearer configured to bear an image and an identification pattern;
 an image former configured to form the image and the identification pattern on the image bearer;
 a transferor configured to transfer the image and the identification pattern on the image bearer directly or indirectly to a recording medium; and
 circuitry configured to:
  determine whether the identification pattern is an image portion pattern arranged at a position superimposed on the image or a position adjacent to the image, or a non-image portion pattern arranged at neither a position superimposed on the image nor a position adjacent to the image; and
  cause the image former to form the non-image portion pattern larger than the image portion pattern.

2. The image forming apparatus according to claim 1, wherein the circuitry is configured to increase a number of dots of the identification pattern to cause the image former to form the non-image portion pattern larger than the image portion pattern.

3. The image forming apparatus according to claim 1, wherein the circuitry is configured to enlarge dots of the identification pattern to cause the image former to form the non-image portion pattern larger than the image portion pattern.

4. The image forming apparatus according to claim 1, wherein the circuitry is configured to cause the image former to form the image portion pattern at a larger size as a density of the image superimposed on or adjacent to the image portion pattern is lower.

5. The image forming apparatus according to claim 1, further comprising a plurality of image bearers including the image bearer configured to bear images,
 wherein the circuitry is configured to:
  cause the image former to form the identification pattern on an image bearer located most upstream among the plurality of image bearers in a moving direction of the recording medium; and
  cause the image former to form the image portion pattern at a larger size as the image superimposed on or adjacent to the image portion pattern is on an image bearer located more downstream among the plurality of image bearers in the moving direction of the recording medium.

6. The image forming apparatus according to claim 1, further comprising:
 a plurality of image bearers including the image bearer configured to bear images; and
 an intermediate transferor configured to receive the images on the plurality of image bearers and transfer the images to the recording medium,
 wherein the circuitry is configured to:
  cause the image former to form the identification pattern on an image bearer located most upstream among the plurality of image bearers in a moving direction of the intermediate transferor, and
  cause the image former to form the image portion pattern at a larger size as the image superimposed on or adjacent to the image portion pattern is on an image bearer located more downstream among the plurality of image bearers in the moving direction of the intermediate transferor.

\* \* \* \* \*